(12) United States Patent
Ohashi

(10) Patent No.: US 9,480,034 B2
(45) Date of Patent: Oct. 25, 2016

(54) RADIO COMMUNICATION DEVICE AND TIMING CONTROL METHOD

(71) Applicant: FUJITSU LIMITED, Kawasaki-shi, Kanagawa (JP)

(72) Inventor: Takashi Ohashi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/850,039

(22) Filed: Sep. 10, 2015

(65) Prior Publication Data

US 2016/0142990 A1 May 19, 2016

(30) Foreign Application Priority Data

Nov. 17, 2014 (JP) .................... 2014-233088

(51) Int. Cl.
| | |
|---|---|
| H04B 17/00 | (2015.01) |
| H04B 1/04 | (2006.01) |
| H04J 3/07 | (2006.01) |
| H04W 56/00 | (2009.01) |
| H04W 24/10 | (2009.01) |

(52) U.S. Cl.
CPC ........... *H04W 56/001* (2013.01); *H04W 24/10* (2013.01)

(58) Field of Classification Search
CPC ...... H04B 7/24; H03M 7/30; H04L 2209/30; G06F 17/30153
USPC ............ 455/101, 114.1, 114.2, 114.3, 115.1; 375/295, 296; 370/498, 503
See application file for complete search history.

(56) References Cited

U.S. PATENT DOCUMENTS

| | | | | | |
|---|---|---|---|---|---|
| 5,751,694 | A | * | 5/1998 | Toft | H04J 3/18 370/503 |
| 6,754,439 | B1 | * | 6/2004 | Hensley | G11B 27/031 348/423.1 |
| 7,403,039 | B1 | * | 7/2008 | Arsovski | H03K 3/35613 326/68 |
| 8,174,428 | B2 | * | 5/2012 | Wegener | H03M 7/30 455/442 |
| 8,693,572 | B2 | * | 4/2014 | Jo | H03M 7/6023 375/295 |
| 2009/0290632 | A1 | | 11/2009 | Wegener | |
| 2011/0228831 | A1 | | 9/2011 | Hirata | |
| 2013/0028112 | A1 | | 1/2013 | Mizutani et al. | |

FOREIGN PATENT DOCUMENTS

| | | |
|---|---|---|
| JP | 2010-502101 | 1/2010 |
| JP | 2011-524117 | 8/2011 |
| JP | 2011-199386 | 10/2011 |
| JP | 2013-30835 | 2/2013 |
| WO | 2008024214 | 2/2008 |

* cited by examiner

*Primary Examiner* — Quochien B Vuong
(74) *Attorney, Agent, or Firm* — Fujitsu Patent Center

(57) ABSTRACT

A radio communication device includes: a receiver configured to receive first and second compressed data strings obtained by compressing, in a control device, a first data string as an object of radio transmission via a first antenna and a second data string as an object of radio transmission via a second antenna different from the first antenna; and a processor configured to process the first and second compressed data strings, wherein the processor: decompresses the first and second compressed data strings and restores the first and second data strings; measures a first decompression time taken for decompressing the first compressed data string and a second decompression time taken for decompressing the second compressed data string; and synchronizes radio transmission timings of restored first and second data strings based on a difference between the first decompression time and the second decompression time.

15 Claims, 7 Drawing Sheets

FIG. 2

RADIO COMMUNICATION DEVICE AND TIMING CONTROL METHOD

CROSS-REFERENCE TO RELATED APPLICATION

This application is based upon and claims the benefit of priority of the prior Japanese Patent Application No. 2014-233088, filed on Nov. 17, 2014, the entire contents of which are incorporated herein by reference.

FIELD

The embodiments discussed herein are related to a radio communication device and a timing control method.

BACKGROUND

Related arts are disclosed in Japanese National Publication of International Patent Application No. 2011-524117 or Japanese Laid-open Patent Publication No. 2011-199386.

SUMMARY

According to an aspect of the embodiments, a radio communication device includes: a receiver configured to receive a first compressed data string and a second compressed data string obtained by compressing, in a control device, a first data string as an object of radio transmission via a first antenna and a second data string as an object of radio transmission via a second antenna different from the first antenna; and a processor configured to process the first compressed data string and the second compressed data string, wherein the processor: decompresses the first compressed data string and the second compressed data string and restores the first data string and the second data string; measures a first decompression time taken for decompressing the first compressed data string and a second decompression time taken for decompressing the second compressed data string; and synchronizes radio transmission timings of a restored first data string and a restored second data string based on a difference between the first decompression time and the second decompression time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates one example of mapping;

DESCRIPTION OF EMBODIMENTS

Figure 1:
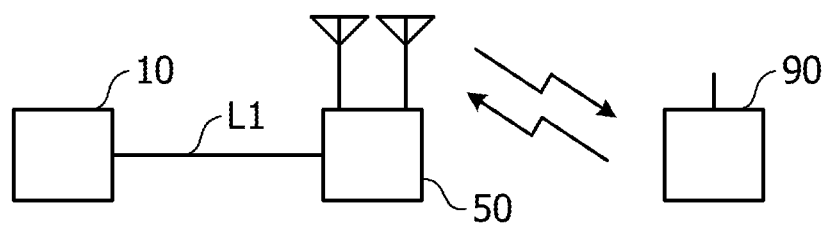
FIG. 1 illustrates one example of a radio communication system.

For example, in the 3rd generation partnership project long term evolution (3GPP LTE), a communication service with use of carrier aggregation (CA) has been started. In the CA, plural component carriers are used between a base station and a terminal. The plural component carriers are associated with antennas different from each other. The component carrier means one unit of the frequency band that can be used for communications. Hereinafter, the component carrier may be represented as "CC."

In order to increase the transmission capacity in a communication system (hereinafter, the transmission capacity may be referred to as "system capacity"), the system capacity may be increased by utilizing "small cells" besides "macrocells" in the 3GPP LTE for example. To make the small cells, a large number of small-cell base stations are disposed. Therefore, the base station may be separated into a radio communication device (RE) that transmits and receives a radio signal and a control device (REC) that carries out supervisory control of the radio communication device and so forth, and plural radio communication devices may be subordinate to one control device.

The radio communication device and the control device are coupled to each other via an optical transmission line, e.g. an optical cable. The specifications of the interface between the radio communication device and the control device are prescribed by the common public radio interface (CPRI). In the prescription, "compression processing" of compressing a raw data string of a radio transmission object is provided in order to respond to an increase in the communication traffic. The "compression processing" is executed on a raw data string in the control device and the obtained compressed data string is transmitted from the control device to the radio communication device. The "compression processing" may increase the communication capacity between the radio communication device and the control device.

If plural antennas are used in communications as in the CA, the radio communication device receives plural "compressed data strings" obtained by the "compression processing" of plural "raw data strings" that are each an object of radio transmission via a respective one of the plural antennas. The data sizes of the plural compressed data strings may be different from each other.

When the data sizes of the received plural compressed data strings are different, the times taken for decompression of the plural compressed data strings, e.g. "decompression times," are different. Therefore, the timings when the plural data strings restored by the decompression are transmitted from respective ends of the plural antennas may deviate from each other. For example, synchronization among the antennas may not be taken.

The asynchronization among the antennas might lower the reception quality in a receiving-side device that finally receives a radio signal, e.g. a terminal.

In the following, the configuration including substantially the same function may be given the same numeral and overlapping description may be omitted or reduced.

FIG. 1 illustrates one example of a radio communication system. In FIG. 1, a radio communication system 1 includes a control device 10, a radio communication device 50, and a terminal 90. The control device 10 and the radio communication device 50 are coupled to each other by an optical transmission line L1. The control device 10 and the radio communication device 50 may be included in a base station. The radio communication device 50 includes plural antennas. The radio communication device 50 and the terminal 90 are wirelessly coupled to each other. The numbers of control devices 10, radio communication devices 50, and terminals 90 may be each one or may be each another arbitrary number. In the following, the number of antennas of the radio communication device 50 is set to two for simplification of explanation.

Figure 2:
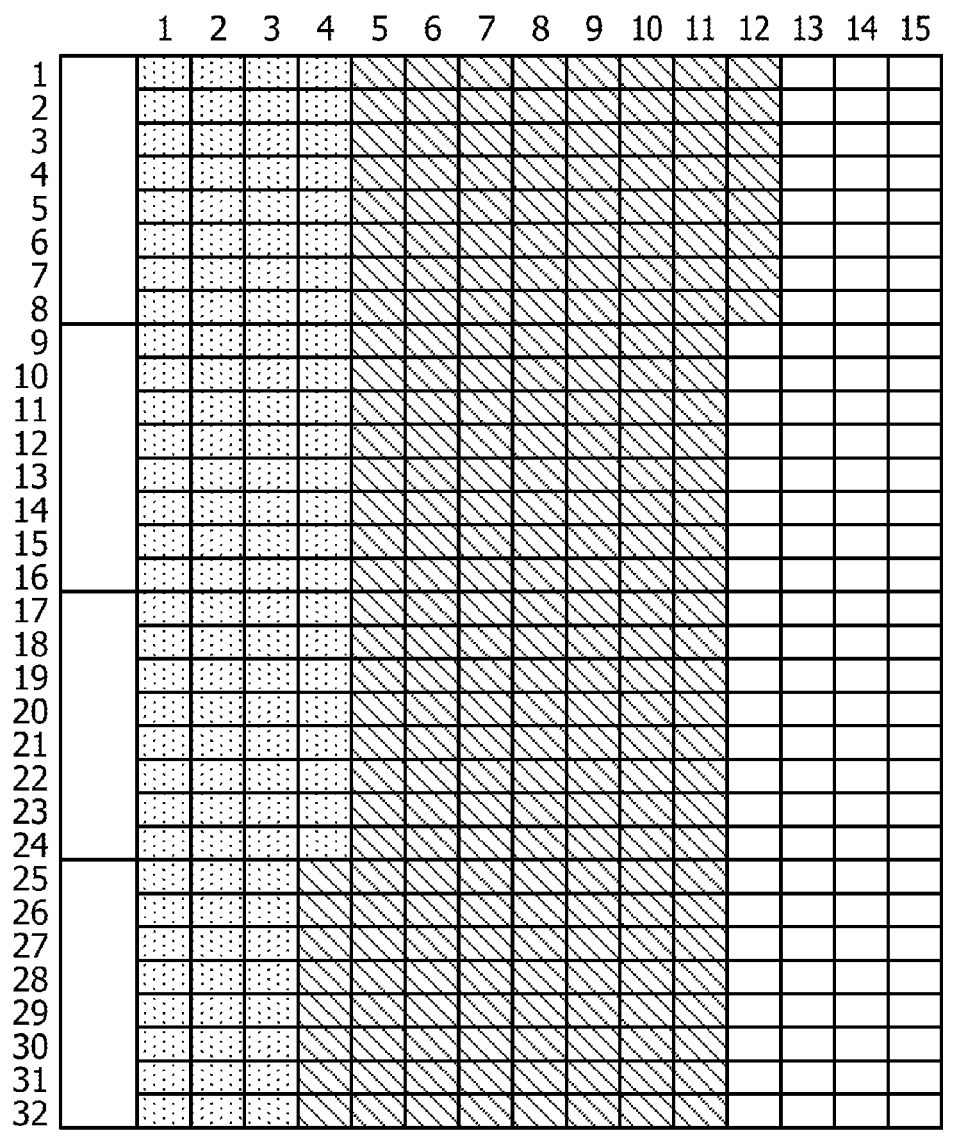

The control device 10 "compresses" each of a "first data string" and a "second data string" and generates a "first compressed data string" and a "second compressed data string." The "first data string" is a data string of an object of radio transmission via a first antenna of the radio communication device 50. The "second data string" is a data string of an object of radio transmission via a second antenna of the radio communication device 50. The data size of the "first data string" and the data size of the "second data string" are different from each other. Consequently, the data size of the "first compressed data string" and the data size of the "second compressed data string" are also different from each other. Such a case possibly occurs for example when the frequency bands corresponding to the first antenna and the second antenna of the radio communication device 50 are different and the bandwidths corresponding to the respective frequency bands are different. FIG. 2 illustrates one example of mapping. In FIG. 2, one example of the part where the first compressed data string and the second compressed data string are mapped in an optical communication frame is illustrated. In FIG. 2, the first compressed data string is discriminated from the second compressed data string based on the kind of hatching. The length of the optical communication frame (CPRI frame) is the chip width and one optical communication frame basically includes 16 words with numbers W=0, . . . 15. The word of W=0 may be a control word. The word length differs depending on the transmission rate and may be 8 bits, 16 bits, or 32 bits. In FIG. 2, the optical communication frame whose word length is 32 bits is illustrated.

The control device 10 performs mapping of the generated "first compressed data string" and "second compressed data string" onto the same "optical communication frame," e.g. a CPRI frame, and transmits the "first compressed data string" and the "second compressed data string" to the radio communication device 50 via the optical transmission line L1.

The radio communication device 50 receives the "first compressed data string" and the "second compressed data string" transmitted from the control device 10. The radio communication device 50 decompresses each of the received "first compressed data string" and "second compressed data string" to restore the "first data string" and the "second data string." The radio communication device 50 measures a "first decompression time" taken for the decompression of the "first compressed data string" and a "second decompression time" taken for the decompression of the "second compressed data string." The radio communication device 50 synchronizes radio transmission timings of the restored "first data string" and "second data string" based on a "difference" between the measured first decompression time and second decompression time. For example, if the second decompression time is longer than the first decompression time, the radio communication device 50 may synchronize the radio transmission timings of the restored "first data string" and "second data string" by setting the time for which the restored "first data string" is buffered longer than the time for which the second data string is buffered by the time corresponding to the "difference."

The radio transmission timings of the restored "first data string" and "second data string" synchronize based on the "difference" between the first decompression time and the second decompression time measured by the radio communication device 50. Therefore, the lowering of the reception quality of the receiving-side device of the radio signal, e.g. the terminal 90, may be reduced.

Figure 3:
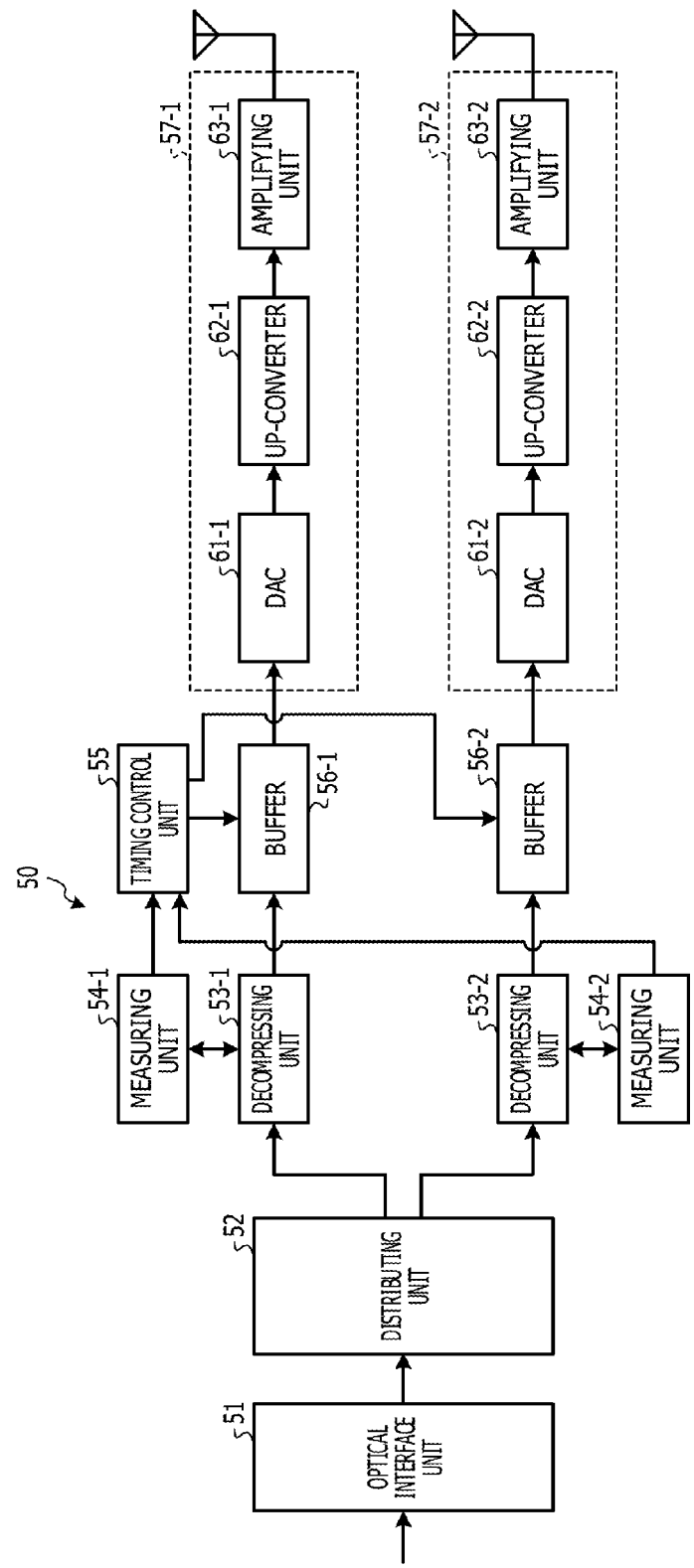
FIG. 3 illustrates one example of a radio communication device.

FIG. 3 illustrates one example of a radio communication device. The radio communication device illustrated in FIG. 3 may be the radio communication device 50 illustrated in FIG. 1. In FIG. 3, the radio communication device 50 includes an optical interface unit 51, a distributing unit 52, decompressing units 53-1 and 53-2, measuring units 54-1 and 54-2, a timing control unit 55, buffers 56-1 and 56-2, and radio transmission units 57-1 and 57-2. The radio transmission unit 57-1 includes a digital-analog converter (DAC) 61-1, an up-converter 62-1, and an amplifying unit 63-1. The radio transmission unit 57-2 includes a DAC 61-2, an up-converter 62-2, and an amplifying unit 63-2. The decompressing unit 53-1, the measuring unit 54-1, the buffer 56-1, and the radio transmission unit 57-1 may be included in a "first transmission system." The decompressing unit 53-2, the measuring unit 54-2, the buffer 56-2, and the radio transmission unit 57-2 may be included in a "second transmission system."

The optical interface unit 51 receives an optical signal transmitted from the control device 10, e.g. an optical communication frame, and converts the received optical signal to an electrical signal to output the obtained electrical signal, e.g. a received electrical signal, to the distributing unit 52.

The distributing unit 52 extracts a first compressed data string and a second compressed data string included in the optical communication frame received by the optical interface unit 51. Then, the distributing unit 52 outputs the extracted first compressed data string to the decompressing unit 53-1 and outputs the extracted second compressed data string to the decompressing unit 53-2.

The decompressing unit 53-1 restores a first data string by decompressing the first compressed data string distributed by the distributing unit 52 and outputs the restored first data string to the buffer 56-1. The decompressing unit 53-2 restores a second data string by decompressing the second compressed data string distributed by the distributing unit 52 and outputs the restored second data string to the buffer 56-2. The decompressing unit 53-1 and the decompressing unit 53-2 may be either different functional units or one functional unit.

The measuring unit 54-1 measures the time taken for the decompression of the first compressed data string in the decompressing unit 53-1, e.g. a first decompression time, and outputs information relating to the measured first decompression time to the timing control unit 55. The measuring unit 54-2 measures the time taken for the decompression of the second compressed data string in the decompressing unit 53-2, e.g. a second decompression time, and outputs information relating to the measured second decompression time to the timing control unit 55. The measuring unit 54-1 and the measuring unit 54-2 may be either different functional units or one functional unit.

The timing control unit 55 carries out control to synchronize the radio transmission timings of the restored first and second data strings based on the "difference" between the first decompression time and the second decompression time measured by the measuring units 54-1 and 54-2, respectively. For example, the timing control unit 55 outputs a "synchronization control signal" to the buffers 56-1 and 56-2. If the second decompression time is longer than the first decompression time, the timing control unit 55 sets the time for which the first data string is buffered by the buffer 56-1 longer than the time for which the second data string is buffered by the buffer 56-2 by the time corresponding to the "difference." Therefore, the radio transmission timings of the restored "first data string" and "second data string" may synchronize.

The buffers 56-1 and 56-2 output the first data string and the second data string, respectively, at a timing based on the synchronization control signal from the timing control unit 55. The first data string is output to the radio transmission unit 57-1 and the second data string is output to the radio transmission unit 57-2.

The radio transmission unit 57-1 executes given radio transmission processing such as digital-analog conversion processing, up-conversion processing, or amplification processing on the first data string output from the buffer 56-1, and transmits an obtained radio signal via a first antenna. The radio transmission unit 57-2 executes given radio transmission processing such as digital-analog conversion processing, up-converting processing, or amplification processing on the second data string output from the buffer 56-2, and transmits an obtained radio signal via a second antenna. The digital-analog conversion processing may be executed in the DACs 61-1 and 61-2. The up-converting processing may be executed in the up-converters 62-1 and 62-2. The amplification processing may be executed in the amplifying units 63-1 and 63-2.

Figure 4:
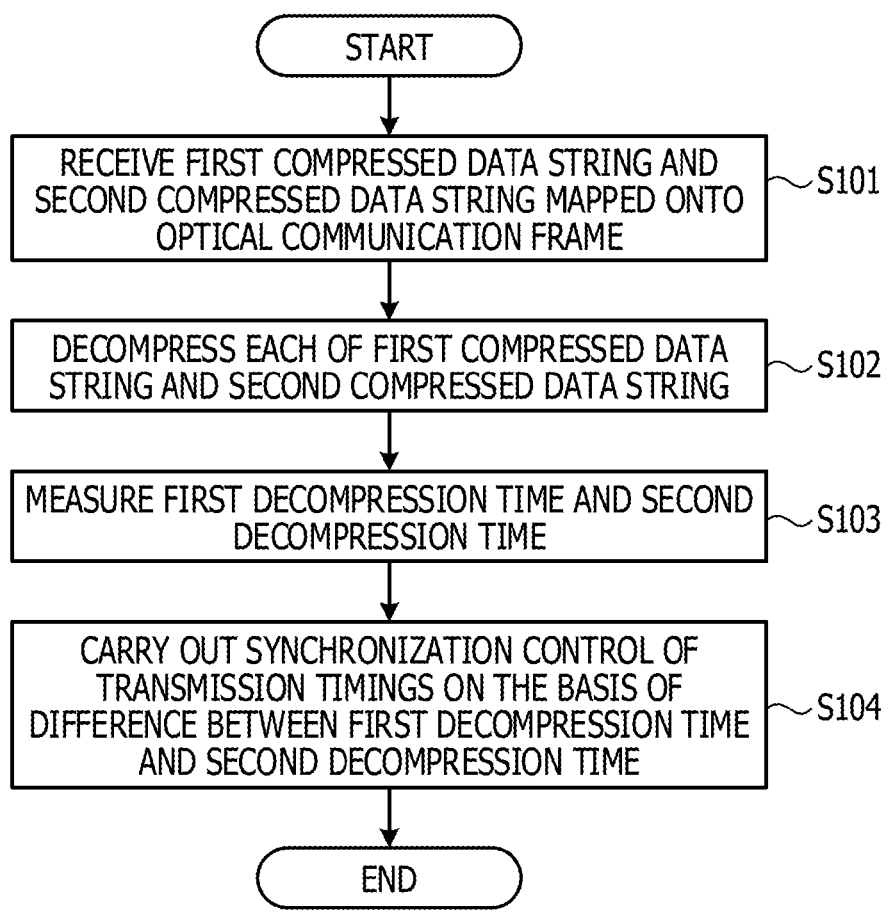
FIG. 4 illustrates one example of processing of a radio communication device.

FIG. 4 illustrates one example of processing of a radio communication device. The processing illustrated in FIG. 4 may be executed by the radio communication device 50 of FIG. 3.

The optical interface unit 51 of the radio communication device 50 receives a first compressed data string and a second compressed data string mapped onto an optical communication frame (operation S101). The received first compressed data string and second compressed data string are output to the decompressing unit 53-1 and the decompressing unit 53-2, respectively, by the distributing unit 52.

The decompressing unit 53-1 and the decompressing unit 53-2 decompress the first compressed data string and the second compressed data string, respectively (operation S102). Thus, a first data string and a second data string are restored.

The measuring unit 54-1 and the measuring unit 54-2 measure a first decompression time and a second decompression time (operation S103). The first decompression time is the time taken for the decompression of the first compressed data string in the decompressing unit 53-1 and the second decompression time is the time taken for the decompression of the second compressed data string in the decompressing unit 53-2.

The timing control unit 55 carries out synchronization control of the radio transmission timings of the restored first and second data strings based on the difference between the first decompression time and the second decompression time measured by the measuring units 54-1 and 54-2, respectively (operation S104). For example, if the second decompression time is longer than the first decompression time, the timing control unit 55 sets the time for which the first data string is buffered by the buffer 56-1 longer than the time for which the second data string is buffered by the buffer 56-2 by the time corresponding to the "difference." Therefore, the radio transmission timings of the restored first and second data strings synchronize.

In the radio communication device 50, the optical interface unit 51 receives the first compressed data string and the second compressed data string. The first compressed data string may be a data string obtained by compression of the first data string as an object of radio transmission via the first antenna of the radio communication device 50 in the control device 10. The second compressed data string may be a data string obtained by compression of the second data string as an object of radio transmission via the second antenna of the radio communication device 50 in the control device 10. The decompressing units 53-1 and 53-2 decompress the received first and second compressed data strings to restore the first and second data strings, respectively. The measuring units 54-1 and 54-2 measure the first decompression time taken for the decompression of the first compressed data string and the second decompression time taken for the decompression of the second compressed data string. The timing control unit 55 synchronizes the radio transmission timings of the restored first and second data strings based on the difference between the measured first and second decompression times.

Due to the radio communication device 50, even if the data sizes of received plural compressed data strings are different, the radio transmission timings of plural data strings restored by decompressing the plural compressed data strings may synchronize. Therefore, the lowering of the reception quality in the receiving-side device of the radio signal may be reduced.

For example, if a data corruption part is caused in a data string obtained by decompression of a compressed data string, "pseudo data" may be inserted into the data corruption part. A control device relating to a configuration to be described below is the same as the above-described control device 10.

Figure 5:
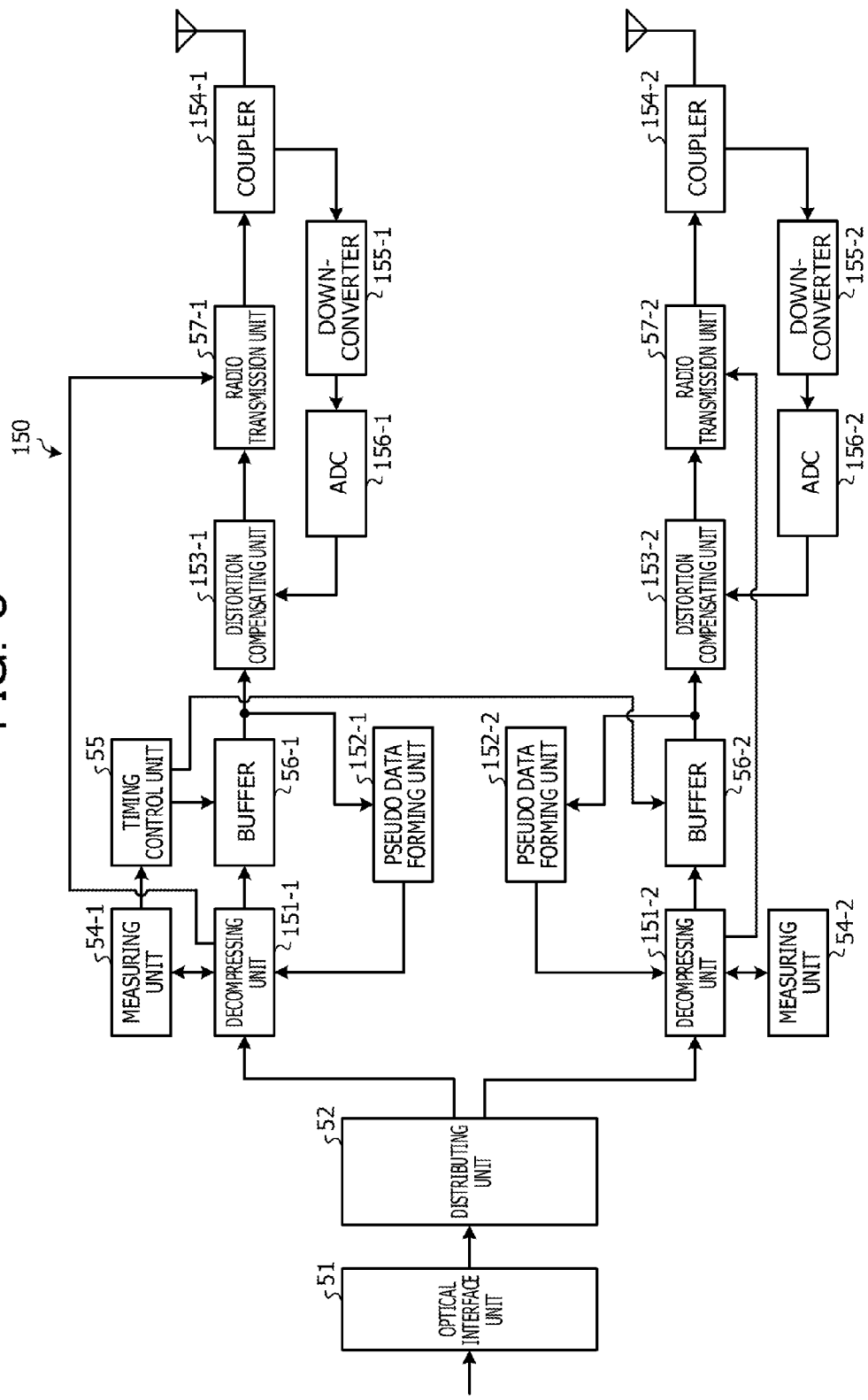
FIG. 5 illustrates one example of a radio communication device.

FIG. 5 illustrates one example of a radio communication device. A radio communication device 150 illustrated in FIG. 5 includes decompressing units 151-1 and 151-2, pseudo data forming units 152-1 and 152-2, distortion compensating units 153-1 and 153-2, couplers 154-1 and 154-2, down-converters 155-1 and 155-2, and analog-digital converters (ADC) 156-1 and 156-2.

The decompressing units 151-1 and 151-2 may include functions that are substantially the same as or similar to the functions of the decompressing units 53-1 and 53-2 illustrated in FIG. 3. If a data corruption part is caused in a restored first data string, the decompressing unit 151-1 inserts "first pseudo data" into the data corruption part. If the first pseudo data is inserted into the data corruption part, the decompressing unit 151-1 outputs, to the radio transmission unit 57-1, a "first timing notification" to notify the timing of input of the first pseudo data to the radio transmission unit 57-1. If a data corruption part is caused in a restored second data string, the decompressing unit 151-2 inserts "second pseudo data" into the data corruption part. If the second pseudo data is inserted into the data corruption part, the decompressing unit 151-2 outputs, to the radio transmission unit 57-2, a "second timing notification" to notify the timing of input of the second pseudo data to the radio transmission unit 57-2.

When a data corruption part is caused in a data string obtained by decompression of a compressed data string, the data corruption part is a no-data interval, e.g. a flat interval. When distortion compensation processing is executed based on a feedback signal corresponding to the data corruption part, the distortion compensation accuracy may deteriorate. Therefore, by insertion of pseudo data into the data corruption part, the deterioration of the distortion compensation accuracy may be reduced.

The pseudo data forming unit 152-1 forms the "first pseudo data" by using an output data string of the buffer 56-1. The pseudo data forming unit 152-1 averages the output data string of the buffer 56-1 to form the "first pseudo data" for example. The pseudo data forming unit 152-2 forms the "second pseudo data" by using an output data string of the buffer 56-2. The pseudo data forming unit 152-2 averages the output data string of the buffer 56-2 to form the "second pseudo data" for example.

The distortion compensating units 153-1 and 153-2 may include substantially the same or similar configurations. For example, the distortion compensating unit 153-1 may be a distortion compensating unit of a pre-distortion (PD) system and includes a lookup table (LUT) in which plural distortion compensation coefficients each corresponding to a respective one of plural addresses corresponding to plural power ranges are stored. The distortion compensating unit 153-1 refers to the LUT in accordance with an address generated according to the power of a transmission baseband signal, e.g. an output signal of the buffer 56-1, and multiples the transmission baseband signal by the distortion compensation coefficient read out from the LUT to generate a PD signal Out(t). The generated PD signal Out(t) is output to the radio transmission unit 57-1. The distortion compensating unit 153-1 updates the distortion compensation coefficient stored in the LUT based on the error between a transmission baseband signal In(t) as a reference signal and a feedback signal FB(t).

Figure 6:
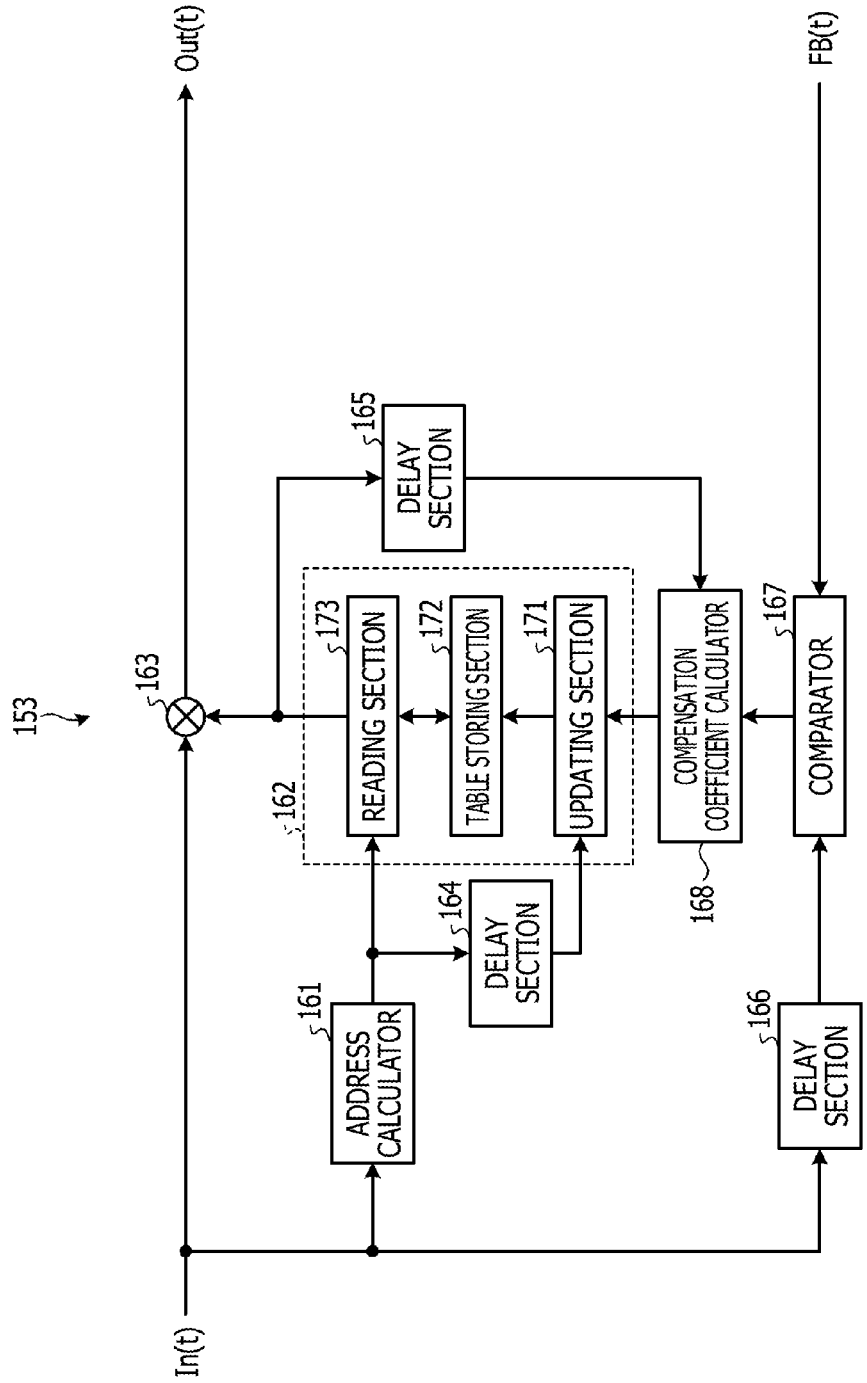
FIG. 6 illustrates one example of a distortion compensating unit.

FIG. 6 illustrates one example of a distortion compensating unit. Each of the distortion compensating units 153-1 and 153-2 in FIG. 5 may include the configuration illustrated in FIG. 6. A distortion compensating unit 153 illustrated in FIG. 6 includes an address calculator 161, an LUT 162, a multiplier 163, delay sections 164, 165, and 166, a comparator 167, and a compensation coefficient calculator 168.

The address calculator 161 calculates the address based on the power value of the transmission baseband signal In(t).

The LUT 162 reads out the distortion compensation coefficient corresponding to the address calculated by the address calculator 161 from a distortion compensation coefficient table and outputs the read distortion compensation coefficient to the multiplier 163 and the delay section 165. The LUT 162 updates the distortion compensation coefficient table by using an update value of the distortion compensation coefficient calculated by the compensation coefficient calculator 168 and an update address received from the delay section 164.

For example, the LUT 162 includes an updating section 171, a table storing section 172, and a reading section 173 as illustrated in FIG. 6.

The updating section 171 executes update processing of updating the distortion compensation coefficient table by using the update value of the distortion compensation coefficient calculated by the compensation coefficient calculator 168 and the update address received from the delay section 164.

The table storing section 172 stores the "distortion compensation coefficient table" in which plural distortion compensation coefficients each corresponding to a respective one of plural addresses are stored.

The reading section 173 reads out the distortion compensation coefficient corresponding to the address calculated by the address calculator 161 from the distortion compensation coefficient table and outputs the read distortion compensation coefficient to the multiplier 163 and the delay section 165.

The multiplier 163 multiples the transmission baseband signal In(t) and the distortion compensation coefficient from the LUT 162 and outputs the transmission baseband signal In(t) resulting from the distortion compensation processing, e.g. the PD signal Out(t), to a radio transmission unit 57.

The delay section 164 delays the address by the amount d1 of delay and outputs the delayed address to the updating section 171 as the update address. The amount d1 of delay may correspond to the total amount of processing delay in the multiplier 163, the radio transmission unit 57, the coupler 154, the down-converter 155, the ADC 156, the comparator 167, and the compensation coefficient calculator 168.

The delay section 165 delays the distortion compensation coefficient output from the LUT 162 by the amount d2 of delay and outputs the delayed distortion compensation coefficient to the compensation coefficient calculator 168. The amount d2 of delay may correspond to the total amount of processing delay in the multiplier 163, the radio transmission unit 57, the coupler 154, the down-converter 155, the ADC 156, and the comparator 167.

The delay section 166 delays the transmission baseband signal In(t) as the reference signal by the amount d3 of delay and outputs the delayed reference signal to the comparator 167. The amount d3 of delay may correspond to the total amount of processing delay in the multiplier 163, the radio transmission unit 57, the coupler 154, the down-converter 155, and the ADC 156. Therefore, the transmission baseband signal In(t) as the reference signal and the feedback signal FB(t) corresponding to the transmission baseband signal In(t) may be supplied to the comparator 167 substantially simultaneously.

The comparator 167 compares the transmission baseband signal In(t) as the reference signal with the feedback signal FB(t) to calculate an error signal e(t) of both of the signals and output the calculated error signal e(t) to the compensation coefficient calculator 168.

The compensation coefficient calculator 168 calculates the update value of the distortion compensation coefficient based on the error signal e(t) received from the comparator 167 and the distortion compensation coefficient received via the delay section 165, and outputs the calculated update value of the distortion compensation coefficient to the updating section 171.

Referring back to FIG. 5, based on the "first timing notification" received from the decompressing unit 151-1, the amplifying unit 63-1 of the radio transmission unit 57-1 operates at the timing of input of the part other than the first pseudo data in the restored first data string and stops at the timing of input of the first pseudo data. Based on the "second timing notification" received from the decompressing unit 151-2, the amplifying unit 63-2 of the radio transmission unit 57-2 operates at the timing of input of the part other than the second pseudo data in the restored second data string and stops at the timing of input of the second pseudo data. Therefore, the "pseudo data," which is not expected to be transmitted from the antenna, may not be subjected to radio transmission.

The coupler 154-1 distributes a signal resulting from power amplification, e.g. an output signal of the amplifying unit 63-1 of the radio transmission unit 57-1, to the first antenna and a feedback path, e.g. the down-converter 155-1. Thus, the signal output from the amplifying unit 63-1 is fed back to the distortion compensating unit 153-1 via the down-converter 155-1 and the ADC 156-1. The coupler 154-2 distributes a signal resulting from power amplification, e.g. an output signal of the amplifying unit 63-2 of the radio transmission unit 57-2, to the second antenna and a feedback path, e.g. the down-converter 155-2. Thus, the signal output from the amplifying unit 63-2 is fed back to the distortion compensating unit 153-2 via the down-converter 155-2 and the ADC 156-2.

The down-converter 155-1 performs down-conversion of the signal input from the coupler 154-1 and outputs the signal resulting from the down-conversion to the ADC 156-1. The down-converter 155-2 performs down-conversion of the signal input from the coupler 154-2 and outputs the signal resulting from the down-conversion to the ADC 156-2.

The ADC 156-1 converts the signal resulting from the down-conversion in the down-converter 155-1 from an analog signal to a digital signal and outputs the digital signal resulting from the conversion to the distortion compensating unit 153-1 as the feedback signal FB(t). The ADC 156-2 converts the signal resulting from the down-conversion in the down-converter 155-2 from an analog signal to a digital signal and outputs the digital signal resulting from the conversion to the distortion compensating unit 153-2 as the feedback signal FB(t).

In the radio communication device 150, if a data corruption part is caused in the restored first data string, the decompressing unit 151-1 inserts the first pseudo data into the data corruption part.

In the radio communication device 150, the deterioration of the distortion compensation accuracy attributed to the data corruption part may be reduced.

The amplifying unit 63-1 operates at the timing of input of the part other than the first pseudo data in the restored first data string and stops at the timing of input of the first pseudo data.

In the radio communication device 150, the "pseudo data," which is not expected to be transmitted from the first antenna, may not be subjected to radio transmission.

As the communication system using plural antennas, the CA may be applied. For example, multiple-input and multiple-output (MIMO) may be employed as the communication system using plural antennas, and a combination of the CA and the MIMO may be employed. For example, a radio communication device may be employed that receives a first compressed data string and a second compressed data string obtained by compressing, in a control device, a first data string as an object of radio transmission via a first antenna and a second data string as an object of radio transmission via a second antenna different from the first antenna.

The radio communication device may receive, from one control device, compressed data strings that are mapped onto one frame and are obtained by compressing data strings that have different sizes and are transmitted from different antennas. For example, the radio communication device may receive compressed data strings that are transmitted from different control devices and are obtained by compressing data strings that have different sizes and are transmitted from different antennas. For example, a radio communication device may be employed that receives a first compressed data string and a second compressed data string obtained by compressing, in a control device, a first data string as an object of radio transmission via a first antenna and a second data string as an object of radio transmission via a second antenna different from the first antenna.

The timing control unit 55 may synchronize the radio transmission timings based on the "difference" between the first decompression time and the second decompression time. In addition to the "difference" between the first decompression time and the second decompression time, the difference between the amount of delay in the radio transmission unit 57-1 and the amount of delay in the radio transmission unit 57-2 may be considered.

The respective constituent elements of the above respective units do not have to be configured as illustrated in the drawings physically. For example, all or part of the respective units may be distributed or integrated functionally or physically in an arbitrary unit according to various kinds of loads, the status of use, and so forth.

All or an arbitrary part of various kinds of processing functions carried out by the respective devices may be carried out on a central processing unit (CPU) or a microcomputer such as a micro processing unit (MPU) or a micro controller unit (MCU). All or an arbitrary part of the various kinds of processing functions may be carried out on a program analyzed and executed on a CPU or a microcomputer such as an MPU or an MCU or on hardware based on wired logic.

Figure 7:
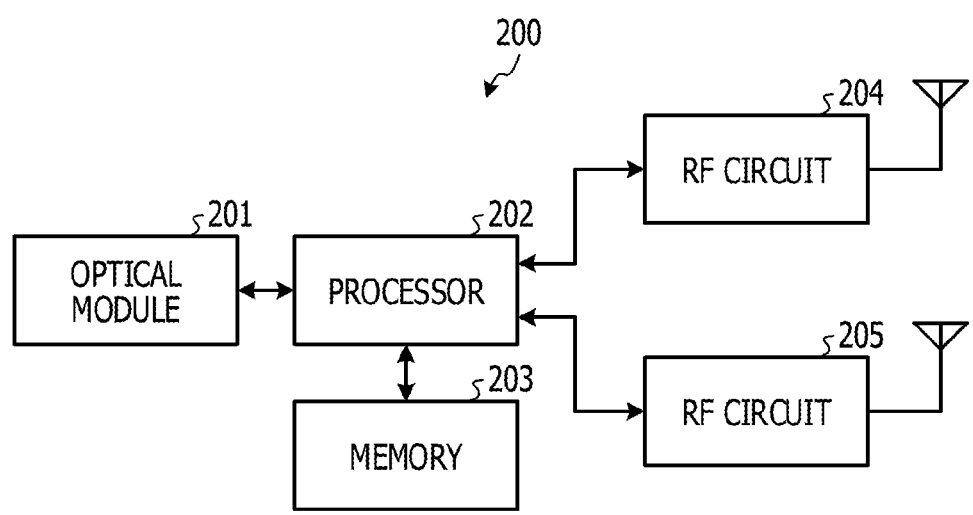
FIG. 7 illustrates one example of a hardware configuration of a radio communication device.

FIG. 7 illustrates one example of a hardware configuration of a radio communication device. The radio communication device illustrated in FIG. 3 or FIG. 5 may include the hardware configuration illustrated in FIG. 7. As illustrated in FIG. 7, a radio communication device 200 includes an optical module 201, a processor 202, a memory 203, and radio frequency (RF) circuits 204 and 205. As one example of the processor 202, a CPU, a digital signal processor (DSP), a field programmable gate array (FPGA), or the like may be used. As one example of the memory 203, a random access memory (RAM) such as a synchronous dynamic random access memory (SDRAM), a read only memory (ROM), a flash memory, or the like may be used.

The various kinds of processing functions carried out by the radio communication device may be implemented through execution of programs stored in various kinds of memories such as a non-volatile storage medium by a processor. For example, programs corresponding to the respective kinds of processing executed by the distributing unit 52, the decompressing units 53-1 and 53-2, the measuring units 54-1 and 54-2, the timing control unit 55, the decompressing units 151-1 and 151-2, the pseudo data forming units 152-1 and 152-2, and the distortion compensating units 153-1 and 153-2 may be recorded in the memory 203 and the respective programs may be executed by the processor 202. The buffers 56-1 and 56-2 may correspond to the memory 203. The radio transmission unit 57-1, the coupler 154-1, the down-converter 155-1, and the ADC 156-1 may correspond to the RF circuit 204. The radio transmission unit 57-2, the coupler 154-2, the down-converter 155-2, and the ADC 156-2 may correspond to the RF circuit 205.

The various kinds of processing functions carried out by the radio communication device may be carried out by the one processor 202 or may be carried out by plural processors.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio communication device comprising:
a receiver configured to receive a first compressed data string and a second compressed data string obtained by compressing, in a control device, a first data string as an object of radio transmission via a first antenna and a second data string as an object of radio transmission via a second antenna different from the first antenna; and
a processor configured to process the first compressed data string and the second compressed data string,
wherein the processor:
decompresses the first compressed data string and the second compressed data string and restores the first data string and the second data string;
measures a first decompression time taken for decompressing the first compressed data string and a second decompression time taken for decompressing the second compressed data string; and
synchronizes radio transmission timings of a restored first data string and a restored second data string based on a difference between the first decompression time and the second decompression time.

2. The radio communication device according to claim 1, further comprising:
an amplifier, provided at an input stage of the first antenna, configured to amplify the restored first data string,
wherein the processor compensates for a non-linear distortion in the amplifier.

3. The radio communication device according to claim 2, wherein the processor inserts pseudo data into a data corruption part when the data corruption part is caused in the restored first data string.

4. The radio communication device according to claim 3, wherein the processor notifies a first timing at which the pseudo data is inserted to the amplifier.

5. The radio communication device according to claim 4, wherein the amplifier stops at the first timing and operates at a second timing of input of data other than the pseudo data.

6. The radio communication device according to claim 2, further comprising:
a table configured to store distortion compensation coefficients corresponding to power,
wherein the processor acquires a distortion compensation coefficient corresponding to power of the restored first data string from the table and processes the restored first data string based on an acquired distortion compensation coefficient.

7. The radio communication device according to claim 1, further comprising:
a first buffer configured to hold the restored first data string and output the restored first data string to a first radio transmitter; and
a second buffer configured to hold the restored second data string and output the restored second data string to a second radio transmitter,
wherein the processor controls a first holding time of the first buffer or a second holding time of the second buffer based on the difference.

8. A timing control method comprising:
receiving a first compressed data string and a second compressed data string obtained by compressing, in a control device, a first data string as an object of radio transmission via a first antenna and a second data string as an object of radio transmission via a second antenna different from the first antenna, respectively;
decompressing, by a processor, the first compressed data string and the second compressed data string and restoring the first data string and the second data string;
measuring a first decompression time taken for decompressing the first compressed data string and a second decompression time taken for decompressing the second compressed data string; and
synchronizing radio transmission timings of a restored first data string and a restored second data string based on a difference between the first decompression time and the second decompression time.

9. The timing control method according to claim 8, wherein a first timing at which the restored first data string is transferred to a first radio transmitter corresponding to the first antenna and a second timing at which the restored second data string is transferred to a second radio transmitter corresponding to the second antenna are controlled based on the difference.

10. The timing control method according to claim 9, further comprising:
amplifying, by an amplifier, the restored first data string; and compensating for a non-linear distortion in the amplifier.

11. The timing control method according to claim 10, further comprising:
inserting pseudo data into a data corruption part in the restored first data string.

12. The timing control method according to claim 11, further comprising:
notifying a first timing at which the pseudo data is inserted to the amplifier.

13. The timing control method according to claim 12, further comprising:
stopping the amplifier at the first timing; and
operating the amplifier at a second timing of input of data other than the pseudo data.

14. The timing control method according to claim 10, further comprising:
acquiring a distortion compensation coefficient corresponding to power of the restored first data string from a table storing distortion compensation coefficients corresponding to power; and
processing the restored first data string based on an acquired distortion compensation coefficient.

15. The timing control method according to claim 8, further comprising:
holding, in a first buffer, the restored first data string and outputting the restored first data string to a first radio transmitter;
holding, in a second buffer, the restored second data string and outputting the restored second data string to a second radio transmitter; and
controlling a first holding time of the first buffer or a second holding time of the second buffer based on the difference.

* * * * *